United States Patent

[11] 3,634,592

[72] Inventors: Heinz-Dieter Pantke, Essen-Frintrop; Ulrich Pohl, Oberhausen-Osterfeld, both of Germany
[21] Appl. No.: 81,286
[22] Filed: Oct. 16, 1970
[45] Patented: Jan. 11, 1972
[73] Assignee: Huttenwerk Oberhausen Aktiengesellschaft, Oberhausen, Germany
[32] Priority: Oct. 23, 1969
[33] Germany
[31] P 19 53 378.9

[54] SYSTEM FOR CHARGING ELECTRIC-ARC FURNACES
10 Claims, 3 Drawing Figs.

[52] U.S. Cl............................................. 13/33
[51] Int. Cl............................................. F27d 3/10
[50] Field of Search................................ 13/12, 13, 33

[56] References Cited
UNITED STATES PATENTS

| | | | |
|---|---|---|---|
| 3,472,649 | 10/1969 | Sibakin et al. | 13/33 UX |
| 3,518,350 | 6/1970 | Lunig | 13/12 |

Primary Examiner—Bernard A. Gilheany
Assistant Examiner—R. N. Envall, Jr.
Attorney—Karl F. Ross

ABSTRACT: An electric-arc furnace for the smelting and refining of sponge iron has respective electrodes each connected to one phase of the polyphase output of a transformer. The sponge iron is fed to a distributor at a rate determined by the total electrical power consumption of all of the electrodes and is distributed into the furnace through charging doors adjacent each electrode by a compartmented distributor, the capacity of the compartments of which is adjustable in accordance with the electrical consumption of the respective electrical phase. The distributor is a circular receptacle having angularly equispaced openings, each connected via a duct with a charging door, and vanes internally subdividing the receptacle to distribute the sponge iron between the openings in a proportion determined by the angular positions of the vanes. The vanes are adjustable within limits in accordance with the consumption of electrical energy of each electrode.

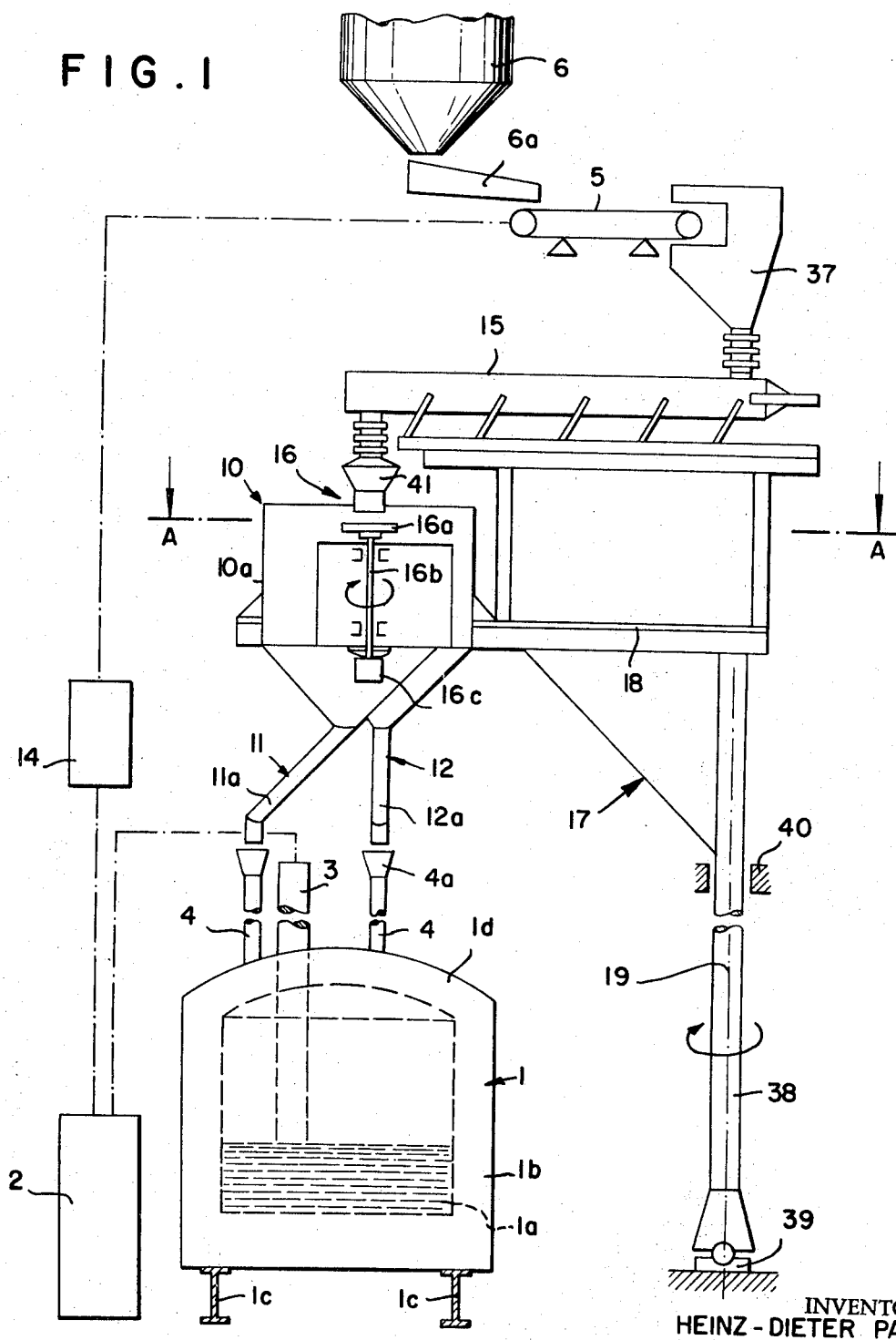

SYSTEM FOR CHARGING ELECTRIC-ARC FURNACES

The present invention relates to a system for charging sponge iron into an electric-arc furnace and, more particularly, to an installation for the smelting and refining of sponge iron using principles of an electric-arc furnace.

The difficulty in smelting sponge iron in gas-fired or regenerative heated furnaces has led to increasing use of electric-arc furnaces for the smelting of sponge iron and the refining thereof to high-grade steels. The electric-arc furnace generally comprises a receptacle (usually turned upwardly) into which one or more electrodes depend in spaced relationship. An electric arc is struck between a pair of electrodes by initially forming a conductive path between them and thereupon igniting the arc to smelt the charge. Once the charge has been smelted, it is usually sufficiently conductive to generate an intense arc in the region between the electrode and the melt. The arc is of a sufficient temperature not only to smelt additional quantities of charge which may be introduced into the furnace but also to refine the charge to whatever degree is desired. In fact, impurities are rapidly volatilized in the intense heat of the arc or are chemically reduced in the bath.

While single-phase arc furnaces have been proposed, it is the common practice to balance the electrical load by providing polyphase energization of an electric-arc furnace for the smelting and refining of iron. In such systems, a three-phase transformer may be provided, each output phase being connected to a respective electrode, the electrodes being spaced apart in the receptacle constituting the body of the furnace.

Attempts have been made to improve the efficiency of polyphase electric-arc furnaces by metering the introduction of additional charge into the furnace to coincide with the electrical power requirements thereof, thereby maintaining electrical efficiency, limiting wastage of electrical power, ensuring optimum electrode efficiency and minimum electrode loss, etc. However, it has been found to be possible to accomplish all these desiderata with conventional systems of this type. Furthermore, all systems for charging electric-arc furnaces through a single door, where these furnaces have multiple electrodes, have resulted in a nonuniform distribution of the charge, thereby altering the electrical parameters and reducing the efficiency of one or another of the electrodes. It is not a solution to distribute the charge uniformly over the entire furnace, moreover, since liquid currents in the bath, the characteristics of the charge, the nature of the arc reaction, the composition and previous history of the electrode and even fluctuations in electrical characteristics result in variations of the operating parameters between one electrode and another in the furnace.

Mention should also be made of the fact that conventional charging systems for electric-arc furnaces are highly expensive and have been unable, in large measure, to prevent reoxidation of sponge iron. It will be appreciated that sponge iron is solid metallic iron, generally derived from a plant for the direct reduction of iron oxide with gases rich in carbon monoxide and hydrogen, and is in a sponge agglomerated form. The extraordinary high surface-area/weight ratio of the sponge iron, which makes it difficult to smelt by other means, creates significant problems with respect to reoxidation in the conventional charging systems of electric-arc furnaces.

It is, therefore, the principal object of the present invention to provide an improved charging system for an electric-arc furnace wherein the aforementioned disadvantages can be obviated.

Another object of the invention is to provide a furnace-charging system for a polyphase electric-arc furnace having improved electrical efficiency and a greater output.

It is also an object of this invention to provide a relatively low-cost and efficient charging arrangement for an electric-arc furnace which optimizes the operation of each electrode and nevertheless provides a high rate of influx of the charge into the furnace, without introducing problems with respect to reoxidation.

These objects and others which will become apparent hereinafter are attained, in accordance with the present invention, in a system for charging an electric-arc furnace having polyphase energization and a plurality of arcing electrodes, each connected with a respective phase of the energization transformer. According to the present invention, the top of the furnace is provided with a corresponding number of openings, each associated with and, advantageously, disposed proximal to one of the electrodes, and a distributor connected to these openings for subdividing a charge of sponge iron and delivering it to the openings. The distributor is provided in the form of a receptacle subdivided internally by upright vanes into respective compartments, each communicating with a respective one of these openings and is fed by a conveyor means.

According to an important feature of this invention, the conveyor or feed means delivering the sponge iron charge to the distributing device is operated under the control of a sensor or monitor of the total power consumption of the arcing electrodes while the power at each phase is used to control or regulate the distribution of the charge between the openings associated with the several phases. It has been found to be desirable, in this regard, to angularly adjust the vanes or the compartments to increase or decrease the flow of sponge iron to the respective openings in accordance with the power consumption at each phase.

For a three-phase energization system, therefore, the electric-arc furnace is provided with three arcing electrodes angularly equispaced about the vertical axis of the furnace and connected each to one phase of a three-phase transformer for energizing the arc electrodes. Three charging openings are provided in angularly equispaced relationship about the aforementioned axis above the bath and preferably proximal to the respective electrodes while a feed device is provided to deliver the charge to a distributor vessel which is preferably cylindrical or constructed with the configuration of a surface of revolution so that it has a circular plan or has a cross section in a plane perpendicular to its axis which is circular. The vanes disposed within the receptacle are angularly adjustable, i.e., are swingable angularly about the vertical axis of the receptacle, and define respective compartments each communicating with one of the aforementioned openings. The charge cascading into the distributor is subdivided into the respective compartments by the upright vanes, each compartment receiving a proportion of the charge which is determined by the angle of its sector in relation to the full circle. Hence each opening receives a proportion of the total charge which is regulated in accordance with the electrical power consumption of the individual electrode.

The feed means, according to the present invention, is constituted as a precision dosing or metering device and may be of any conventional type although a dosing balance or scale operated by weighing the sponge iron, is preferred. Feed weighing devices and scales of this type are disclosed at pages 22–35 ff. of PERRY'S Chemical Engineering Handbook, McGraw-Hill Book Co., New York, 1963. The distributing device, according to the present invention, into which the feed weigher discharges, is preferably provided with an upwardly open cylindrical receptacle having downwardly convergent funnel-shaped compartments communicating with the openings of the furnace via shoots, ducts or the like. The distributor receptacle advantageously has upright partitions constituting the vanes and subdividing the interior of the receptacle into sectors. These partitions are individually adjustable according to the invention within limits and preferably in the angular sense with respect to the axis of the receptacle.

To accommodate the feed device to various furnace requirements, it has been found to be advantageous for providing means for adjusting the total sponge-iron feed rate as well as the feed rates of the sponge iron to each of the charging openings. This adjustment may be achieved by setting a reference signal forming an input to a servocontrol system, the other input of which is a signal constituting a function of the total electrical consumption of the furnace (in the case of total feed rate) or a signal proportional to the power consumption of a single phase, where the feed rates associated with the individual electrodes are concerned.

The control concept is based upon the principle that a given power consumption of the transformer is associated, for a particular furnace, with a predetermined quantity of the sponge iron. Feedback networks and control loops may be provided to ensure maintenance of narrow tolerances of the individual feed rates as well as the total feed rates and for maintaining the desired level of transformer power consumption.

The conveyor means between the metering device and the distributing device need not be of any particular construction; however, it has been found to be best to make use of conveyor worms, oscillating feeders and the like. It has also been found to be important, in this connection, that the conveyor have a higher capacity in terms of the volume of sponge iron transported per unit time than the metering device. To ensure a uniform distribution of the sponge iron over the cross section of the distributor, it has been found to be advantageous to disclose a rotary scattering body at the mouth of the distributor above the vanes. This scattering member may be a plate disposed within the distributor mouth and located along the axis of the distributor receptacle but lying transversely thereto and rotated about the receptacle axis at high speed. The plate may be provided with channels or the like and, advantageously, the speed is adjustable to accommodate sponge-iron throughputs within wide ranges. Furthermore, since the preferred configuration of the apparatus described above makes use of an arrangement disposed above the electric-arc furnace, the entire assembly is mounted upon an arm, gantry or the like so as to be shiftable away from the furnace to facilitate access to the electrodes thereof.

Among the advantages of the system of the present invention is the fact that the charging process is more uniform than with earlier arrangements, overheating at one electrode or excess deposition of fresh charge at another are avoided, access to the electrodes is facilitated and the entire charging arrangement can be readily rendered gastight to prevent reoxidation. Moreover, the system can be used effectively with heated sponge iron, thereby further improving the smelting and refining efficiency since the electric-arc furnace is not required to replace heat normally present in sponge iron derived from a direct-reduction plant and lost by intervening cooling.

The above and other objects, features and advantages of the present invention will become more readily apparent from the following description, reference being made to the accompanying drawing in which:

FIG. 1 is a diagrammatic elevational view, partly in section, of an apparatus embodying the present invention;

Figure 3:
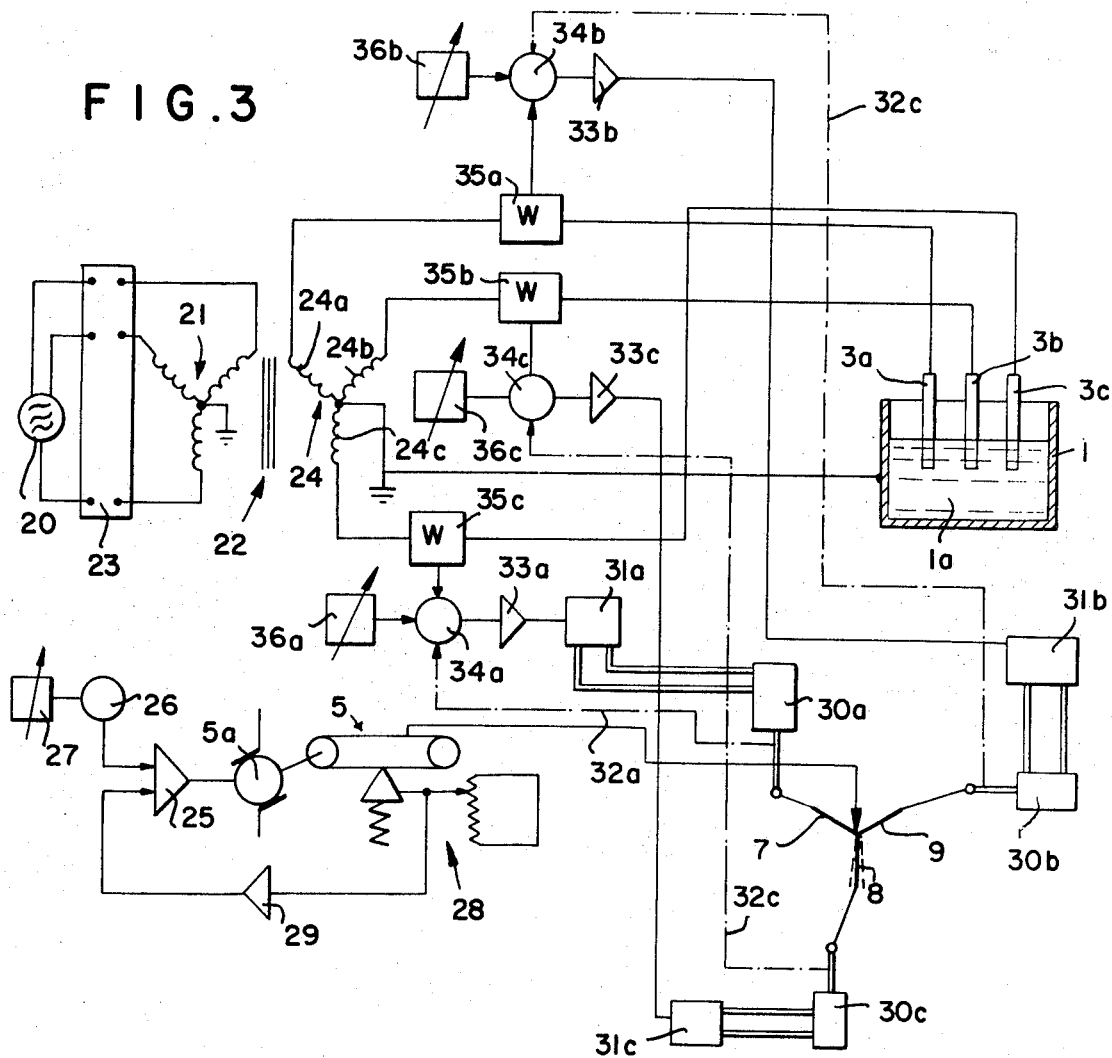
FIG. 3 is a circuit diagram illustrating other aspects of the invention.
Figure 2:
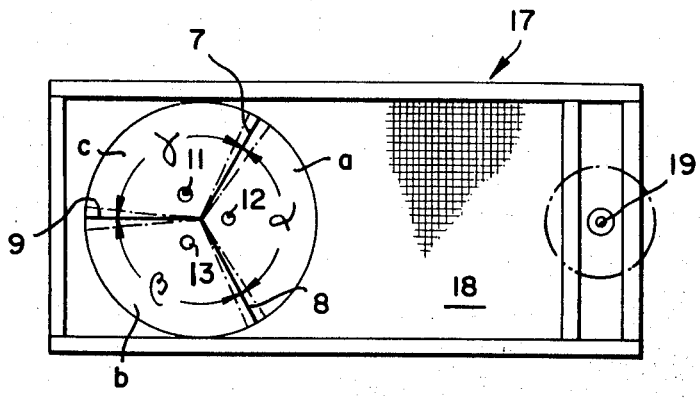
FIG. 2 is a section taken along the line II—II of FIG. 1.

Referring first to FIG. 3, it will be seen that the electric-arc furnace 1, having three spaced-apart electrodes $3a$, $3b$ and $3c$, receives a body $1a$ of iron to be refined into steel. The sponge-iron-feed arrangement, shown structurally in FIGS. 1 and 2, is controlled or regulated in accordance with the electrical power input and consumption as described earlier. To this end, a three-phase source 20 is connected to the primary winding 21 of a power transformer 22 via a wattmeter 23 or some other means for sensing the total power consumption of the furnace. The secondary winding 24 of this transformer has coils $24a$, $24b$ and $24c$ respectively connected to the electrodes $3a$, $3b$ and $3c$ for energizing the latter for respective phases for the three-phase network.

In accordance with the principles of the invention, a metering device represented generally at 5 and consisting of a weighing conveyor, is controlled in response to the total power input of the transformer to determine the total feed of the sponge iron to the furnace. The weighing conveyor 5 may be of the type described in PERRY'S Chemical Engineers' Handbook cited earlier. The conveyor drive is here represented at $5a$ and is shown to be a servomotor energized by a servoamplifier 25, one input of which derives from a comparator 26. The basic system is that described in Servomechanism Practice, McGraw-Hill Book Co., New York 1960, pages 4 ff. The reference input to the comparator 26 derives from a potentiometer 27 or some similar reference source which can be adjusted to establish the desired level of sponge-iron feed to the apparatus. The other input to the comparator 26, of course, is the signal derived from the sensor 23. A feedback loop including a sensor 28 responsive to the sponge-iron feed, and a feedback amplifier 29, provide the other input to the servoamplifier 25. The feedback loop, of course, assures the maintenance of the preselected relationship of electric power consumption and sponge-iron feed within narrow limits.

As will be evident hereinafter, the metering device 5 etc. delivers the sponge iron to a distributing device in which a plurality of vanes or partitions 7, 8 and 9 are angularly displaceable to adjust the dimensions of the sectors defined therebetween and hence the proportions of the sponge iron delivered to each of the openings of the furnace, each opening being proximal to a respective electrode as noted earlier. The vanes 7, 8 and 9 are provided with several motors in the form of piston-and-cylinder arrangements $30a$, $30b$ and $30c$ hydraulically energizable through valves $31a$, $31b$ and $31c$. The principles of such hydraulic energization and feedback from such systems along the loops $31a$, $32b$ and $32c$ are described at pages 391 ff. of Servomechanism Practice. The valves $31a$–$31$ are controlled, in turn, by respective amplifiers $33a$, $33b$ and $33c$ with inputs from comparators $34a$, $34b$, $34c$. Each of these comparators receives a control input or signal from a power-responsive sensor $35a$, $35b$ or $35c$ connected to the respective phase of the secondary winding of the transformer. The reference inputs $36a$, $36b$ and $36c$ to each comparator permits the desired lever of feed for a given power consumption of each phase to be set. It will be apparent, therefore, that the total quantity of sponge iron fed to the distribution device is metered accurately in accordance with the total power input, while distribution of the sponge iron to the individual openings of the furnace is effected with precision in accordance with the instantaneous power consumption at the respective electrode.

Referring now to FIGS. 1 and 2, it will be seen that an electric-arc furnace 1 for the smelting and refining of sponge iron comprises a refractory basin $1b$ retaining the melt $1a$ and melted upon a foundation $1c$. The cover of the furnace is shown at $1d$ and is provided with a plurality of charging openings from which risers 4 extend. The risers 4 carry funnels $4a$ at their upper ends. Only a single electrode is shown at 3 for this furnace and only two openings 4 have been illustrated to avoid obscuring other aspects of the apparatus. Above the furnace, there is provided a charging arrangement 5, 6, 10 for the continuous introduction of sponge iron into the furnace.

The charging arrangement comprises the metering device 5, constituted as a conveyor scale as previously noted, which receives the sponge iron from a hopper 6 via a chute $6a$. The sponge iron is introduced by the control metering device 5 into a hopper 37 located along the axis of the charging device and communicating with a sealed oscillating conveyor represented at 15. The conveyor 15, is, in turn, mounted upon a support generally shown at 18 in the form of a trestle carried by the frame 17 and an upright 38 rotatable about the axis 19 on a pedestal 39. The support for the upright may be a post represented diagrammatically at 14. The oscillating conveyor 15 may be of the type described at pages 7–12 ff. of PERRY'S Chemical Engineers' Handbook. At the discharge end of the conveyor 15, a hood 41 is provided to empty the sponge iron onto a scattering mechanism represented diagrammatically at 16. The scattering means comprises a distributing plate $16a$, a rotary chute or the like, carried by a shaft $16b$ journaled axially in the distributor device which is represented generally at 10. An adjustable speed motor $16c$ drives the scattering plate $16a$ which serves to disperse the sponge iron uniformly over the mouth of the distributor 10.

The distributor 10 is constituted as a cylindrical receptacle 10a internally subdivided into compartments a, b, c, of sectoral configuration by the vertical radially extending partitions or vanes 7, 8 and 9. In plan, the receptacle 10 has a circular configuration. The angular extent of the sectors a, b and c is represented at $\alpha$, $\beta$ and $\gamma$ and is, of course, adjustable as described with reference to FIG. 3 within limits represented by dot-dash lines in FIG. 1. These limits are, of course, determined by the limits of variation of the individual electric power parameters. Hence the sponge iron feed rate to the opening 4 associated with the electrode 3a, for example, may be the fraction $$\frac{\alpha}{\alpha+\beta+\gamma} = \frac{\alpha}{360°}$$

of the total quantity of sponge iron delivered to the furnace, where the power consumption of the electrode 3a is P $3a=\alpha$ /360° P, P being the total power consumption.

Below the compartments a, b and c, hoppers 11, 12 etc. are provided and are of frustoconical configuration, to lead the sponge iron via chutes 11a, 12a etc. to the charging openings 4.

In FIGS. 1 and 2, moreover, there is shown the control system generally diagrammatically at 2 to be connected to respond to the power consumption of the individual electrodes 3 and the total consumption and to control the metering conveyor 5.

The control circuit 14, as noted, permits regulations of the rate of sponge iron flow in relation to the power consumption. In place of the oscillating conveyor 15, a screw conveyor may be employed. The entire frame 17 with the platform 18 is swingable about the axis 19 to clear the furnace and permit access to the electrodes 3.

The improvement described and illustrated is believed to admit of many modifications within the ability of persons skilled in the art, all such modifications being considered within the spirit and scope of the invention except as limited by the appended claims.

We claim:

1. An electric-furnace installation comprising an electric-arc furnace having a plurality of electrodes; a polyphase electric source having a respective electrical phase connected to each of said electrodes; charging means including a metering device for delivering sponge iron to said furnace and a distributing device receiving sponge iron from said metering device and distributing same to selected locations of the furnace associated with said electrodes; and control means responsive to the power consumption input to said source for controlling said metering device and in response to the individual power consumptions at said electrodes for adjusting said distributing device to regulate the proportion of sponge iron delivered to each of said locations.

2. The installation defined in claim 1 wherein said metering device is a weighing conveyor.

3. The installation defined in claim 1 wherein said distributing device comprises an upwardly open receptacle of circular-plan configuration and a plurality of upright radial partitions subdividing the interior of said receptacle into sectors of variable compass, each of said sectors communicating with a respective one of said locations.

4. THe installation defined in claim 3, further comprising respective discharge funnels below each of said sectors, said locations being provided with charging openings in said furnace, said funnels and said openings being connected by respective ducts.

5. The installation defined in claim 4, further comprising means for angularly shifting said vanes in response to the power consumption at an associated electrode.

6. The installation defined in claim 5 wherein the last-mentioned means includes a feedback loop.

7. The installation defined in claim 5, further comprising conveying means between said metering device and said distributing device and operable at a rate in excess of that of said metering device.

8. The installation defined in claim 7, further comprising a scattering member adjustably rotatable in said receptacle for uniformly dispersing the sponge iron to said sectors.

9. The installation defined in claim 8 wherein said charging means is provided upon a support swingable about an axis offset from said furnace to clear the same and afford access to said electrodes.

10. The installation defined in claim 9 wherein said conveying means is an oscillating conveyor.

* * * * *